(12) United States Patent
Zhang et al.

(10) Patent No.: US 12,315,295 B1
(45) Date of Patent: May 27, 2025

(54) METHOD FOR RECOVERING FACE IMAGE BASED ON SEMANTIC FEATURES

(71) Applicant: NANJING UNIVERSITY OF POSTS AND TELECOMMUNICATIONS, Nanjing (CN)

(72) Inventors: Dengyin Zhang, Nanjing (CN); Weidan Yan, Nanjing (CN); Chao Zhou, Nanjing (CN); Fan Gao, Nanjing (CN); Xiaoye Ruan, Nanjing (CN); Siyu Wang, Nanjing (CN); Shuying Xu, Nanjing (CN)

(*) Notice: Subject to any disclaimer, the term of this patent is extended or adjusted under 35 U.S.C. 154(b) by 0 days.

(21) Appl. No.: 18/812,170

(22) Filed: Aug. 22, 2024

Related U.S. Application Data (63) Continuation of application No. PCT/CN2024/109800, filed on Aug. 5, 2024.

(30) Foreign Application Priority Data

Mar. 22, 2024 (CN) .......................... 202410335303.2

(51) Int. Cl.
G06V 40/00 (2022.01)
G06V 10/80 (2022.01)
G06V 40/16 (2022.01)

(52) U.S. Cl.
CPC .......... G06V 40/171 (2022.01); G06V 10/806 (2022.01); G06V 40/161 (2022.01)

(58) Field of Classification Search
CPC ... G06V 40/171; G06V 10/806; G06V 40/161
See application file for complete search history.

(56) References Cited

U.S. PATENT DOCUMENTS 11,869,275 B1 * 1/2024 Joseph ................. G06V 40/172
12,175,641 B2 * 12/2024 Mironica ................. G06T 3/18
(Continued)

FOREIGN PATENT DOCUMENTS

CN 104008538 A 8/2014
CN 113128624 A 7/2021
(Continued)

OTHER PUBLICATIONS

Ji Ming-Ye; Zhang Deng-Yin; Ji Ying-Tian;, <Image Haze Removal Algorithm Based on Haze Thickness Estimation>, <Acta Automatica Sinica>, Sep. 30, 2016, pp. 85-97, vol. 42, No. 9.
(Continued)

Primary Examiner — Md K Talukder (57) ABSTRACT

The present application discloses a method for recovering a face image based on semantic features, which includes obtaining a to-be-recovered face image; inputting the to-be-recovered face image into a recovery model trained to obtain a recovered face image; the recovery model includes: an encoder, configured for generating low-quality face semantic features based on the to-be-recovered face image; a reference image generator, configured for generating a plurality of high-quality face reference images by inputting random noise based on the low-quality face semantic features; a feature transfer, configured for constructing a face component feature dictionary based on the plurality of high-quality face reference images, and transferring high-quality component features in the face component feature dictionary to the low-quality face semantic features to obtain high-quality face semantic features; and a decoder, configured for generating the recovered face image based on the high-quality face semantic features.

9 Claims, 4 Drawing Sheets

(56) References Cited

U.S. PATENT DOCUMENTS

| | | | |
|---|---|---|---|
| 2016/0093026 A1* | 3/2016 | Choudhury | G06T 3/4053 |
| | | | 382/266 |
| 2018/0075581 A1 | 3/2018 | Shi et al. | |
| 2022/0076459 A1* | 3/2022 | Zhang | G06T 3/4046 |
| 2023/0138049 A1* | 5/2023 | Zhang | G06V 40/168 |
| | | | 382/201 |
| 2023/0222628 A1* | 7/2023 | Zhao | G06V 40/168 |
| | | | 382/156 |
| 2024/0087083 A1* | 3/2024 | Wang | G06T 9/002 |
| 2024/0119671 A1* | 4/2024 | Liu | G06T 7/60 |
| 2024/0378921 A1* | 11/2024 | Shu | G06V 40/172 |

FOREIGN PATENT DOCUMENTS

| | | |
|---|---|---|
| CN | 114372937 A | 4/2022 |
| CN | 116543388 A | 8/2023 |
| CN | 117391968 A | 1/2024 |
| CN | 117391995 A | 1/2024 |
| CN | 117475042 A | 1/2024 |
| CN | 117710252 A | 3/2024 |
| CN | 118262395 A | 6/2024 |

OTHER PUBLICATIONS

Zhang dengyin, et al., High-Resolution Representations network for single image dehazing, «Sensors» Mar. 15, 2022, pp. 1-14.
Li Xiaoming, et al., Blind Face Restoration via Deep Multi-scale Component Dictionaries «https://arxiv.org/abs/2008.00418», Aug. 2, 2020, pp. 1-16.
Yanjiang Yu, et al., Multiprior Learning via Neural Architecture Search for Blind Face Restoration, «IEEE Transactions on Neural Networks and Learning Systems», Dec. 12, 2023, pp. 1-12.

\* cited by examiner

METHOD FOR RECOVERING FACE IMAGE BASED ON SEMANTIC FEATURES

CROSS-REFERENCE TO RELATED APPLICATIONS

The present application claims priority to Chinese Patent Application No. 202410335303.2, filed Mar. 22, 2024, the entire disclosure of which is incorporated herein by reference.

TECHNICAL FIELD

The present application relates to a method for recovering a face image based on semantic features, and belongs to the field of image processing technology.

BACKGROUND

With the development of science technology and the improvement of living standards, image and video data enhance exponentially, which contain a large amount of image or video data with human subjects. In addition, face recognition, face matching, drones, and face tracking in monitors, and other applications are emerging. However, due to the instability of imaging devices, such as focus failure and camera shake; imaging environment factors, such as low light, high exposure, and subject movement; and network transmission conditions, such as compression, zoom, and code formats, etc., various types and different degrees of degradation of images, such as blurring and noise, etc., exist, and the complex degradation not only reduces the observation effect of the human eye, especially in the face of the face image, but also brings negative effects on significant personal and property safety, such as: face access control, payment, and security monitoring. Thus, the face image recovery aims to recover clear face images from degraded face images to help in face vision work, such as face detection and recognition. Compared with natural images, face images not only contain details of visual perception, but also individual features of the five senses and identity information.

Currently, the face recovery method can be mainly categorized into three types: methods based on geometric a priori, methods based on reference, methods based on generating a priori. Existing methods based on geometric a priori are often difficult to capture effective geometric information from low-quality face images; existing methods based on reference generally construct a dictionary with a certain capacity in advance, so their generalization performance is low in the real degraded face images; existing methods based on generating a priori ignore the identity information of the face during the recovery operation.

Most of the above methods only focus on the recovery of the geometric structure and detailed texture of the face, while ignoring the mining and maintenance of the semantic information, resulting in that the generated face image looks real, but its basic features are changed.

SUMMARY

An object of the present application is to overcome the deficiencies in the related art and provide a face image recovery method based on semantic features, a reference image generator and a feature transfer based on the recovery model, which can improve the problem of ignoring semantic information in the existing methods, ensure the consistency of the face semantic information while guaranteeing the details and textures of the recovery results, and achieves high evaluation index scores and high-quality visualization effects in real scenarios.

In order to achieve the above purpose, the present application is realized by adopting the following technical solutions.

The present application provides a method for recovering a face image based on semantic features, which includes:
 obtaining a to-be-recovered face image;
 inputting the to-be-recovered face image into a recovery model trained to obtain a recovered face image;
 the recovery model includes:
 an encoder, configured for generating low-quality face semantic features based on the to-be-recovered face image;
 a reference image generator, configured for generating a plurality of high-quality face reference images by inputting random noise based on the low-quality face semantic features;
 a feature transfer, configured for constructing a face component feature dictionary based on the plurality of high-quality face reference images, and transferring high-quality component features in the face component feature dictionary to the low-quality face semantic features to obtain high-quality face semantic features; and
 a decoder, configured for generating the recovered face image based on the high-quality face semantic features.

In one embodiment, the encoder includes five residual convolution units and four 2-fold down-sampling units, and the five residual convolution units and the four 2-fold down-sampling units are alternately connected in series.

In one embodiment, the reference image generator includes a first generator module, a second generator module and a third generator module connected in series sequentially;
 each of the first generator module and the second generator module comprises a semantic feature fusion unit, a residual convolution unit and a 2-fold up-sampling unit connected in series sequentially; and
 the third generator module comprises the semantic feature fusion unit and the residual convolution unit connected in series sequentially.

In one embodiment, the semantic feature fusion unit includes one normalization layer and two convolution layers connected in series sequentially, and the semantic feature fusion unit is configured for fusion of the low-quality face semantic features and the random noise.

In one embodiment, the feature transfer includes a dictionary construction module and a feature transfer module;
 the dictionary construction module includes a face feature extraction unit, a first face component detection unit and a dictionary construction unit connected in series sequentially;
 the face feature extraction unit includes a plurality of the residual convolution units and 2-fold down-sampling units connected in series sequentially and alternately for obtaining a plurality of high-quality face reference features based on the plurality of high-quality face reference images;
 the first face component detection unit, configured for obtaining high-quality component features of different component categories based on the plurality of high-quality face reference features;

the dictionary construction unit, configured for constructing the face component feature dictionary based on the high-quality component features of different component categories;

a feature transfer module comprises a second face component detection unit, a dictionary lookup unit and a feature fusion unit connected in series sequentially;

the second face component detection unit, configured for obtaining a low-quality component feature of a corresponding component category based on the low-quality face semantic features;

the dictionary lookup unit, configured for obtaining the high-quality component features of a corresponding component category based on the low-quality component feature and the constructed face component feature dictionary; and the feature fusion unit, configured for fusing the low-quality face semantic features and the high-quality component features of the corresponding component category to obtain the high-quality face semantic features.

In one embodiment, the decoder includes five residual convolution units and four 2-fold up-sampling units, the five residual convolution units and the four 2-fold up-sampling units are alternately connected in series.

In one embodiment, the method for training the recovery model includes:
  obtaining a training set, the training set includes a to-be-recovered face training image and a corresponding real face recovery image;
  inputting the to-be-recovered face training image into the pre-constructed recovery model to obtain a recovered face training image;
  calculating a recovery model loss function based on the recovered face training image and the corresponding face real recovery image;
  iteratively updating the recovery model based on a gradient descent method, and taking the recovery model with a smallest recovery model loss function as the trained recovery model.

In one embodiment, obtaining the training set includes:
  obtaining a high-quality face image, and taking the high-quality face image as the face real recovery image;
  adjusting pixels of the high-quality face image to obtain a degraded face image, and taking the degraded face image as the to-be-recovered face training image;
  adjusting pixels is expressed as:

$$I_{lq} = \{JPEG_q((I_{hq} * k_\sigma) \downarrow_s + n_\delta)\} \uparrow_s,$$

$I_{lq}$ denotes the degraded face image, i.e., the to-be-recovered face training image; $JPEG_q$ denotes JPEG compression with a compression quality of q; $I_{hq}$ denotes the high-quality face image, i.e., the face real recovery image; * denotes a convolution operation; $k_\sigma$ denotes a fuzzy kernel of sigma=σ; $\downarrow_s$ denotes a s-fold down-sampling operation; $n_\delta$ denotes a Gaussian noise of sigma=δ; and $\uparrow_s$ denotes a s-fold up-sampling operation.

In one embodiment, the recovery model loss function is expressed as:

$$L = L_{l1} + \lambda_{per} L_{per} + \lambda_{adv} L_{adv},$$

L denotes a recovery model loss function value; $L_{l1}$ denotes a L1 loss value; $\lambda_{per}$ denotes a perceived loss weight; $L_{per}$ denotes a perceived loss value based on a VGG network; $\lambda_{adv}$ denotes an adversarial loss weight; and $L_{adv}$ denotes an adversarial loss value based on adversarial training.

In one embodiment, the L1 loss value $L_{l1}$ is expressed as:

$$L_{l1} = |I_{hq} - \hat{I}_{hq}|_1$$

$I_{hq}$ denotes the face real recovery image; $\hat{I}_{hq}$ denotes the recovered face training image; and $|\cdot|_1$ denotes an average absolute error;

the perceived loss value $L_{per}$ based on the VGG network is expressed as:

$$L_{per} = \|\emptyset(I_{hq}) - \emptyset(\hat{I}_{hq})\|_2^2,$$

Ø denotes feature maps from a first to fifth convolution layers in the pre-trained VGG model; $\|\cdot\|_2^2$ denotes a square of a 2-parameter;

the adversarial loss value $L_{adv}$ based on adversarial training is expressed as:

$$L_{adv} = -E_{\hat{I}_{hq}} \text{softplus}(D(\hat{I}_{hq})),$$

D(·) denotes an output of a discriminator in the adversarial training; $E_{\hat{I}_{hq}}$ denotes an expected value about a $\hat{I}_{hq}$ distribution; softplus denotes a softplus function, which is expressed as:

$$\text{softplus}(x) = \ln(1 + e^x).$$

Beneficial Effects Achieved by the Present Application Compared to the Related Art:

In the face image recovery method based on semantic features of the present application, firstly, the reference image generator based on the recovery model generates a plurality of high-quality face reference images by inputting random noise and guided by semantic information; the feature transfer based on the recovery model constructs a face component feature dictionary which is a semantically guided lightweight and easy to be quickly foud, which can improve the problem of ignoring the semantic information in the existing methods, and can improve the generalization performance of the face recovery model, and can ensure the consistency of the face semantic information while guaranteeing the details and textures of the recovery results, and achieves high evaluation index scores and high-quality visualization effects in real scenarios.

DETAILED DESCRIPTION OF THE EMBODIMENTS

The present application is further described below in conjunction with the accompanying drawings. The following embodiments are only used to more clearly illustrate the technical solution of the present application, and are not to be used to limit the scope of the present application.

Figure 1:
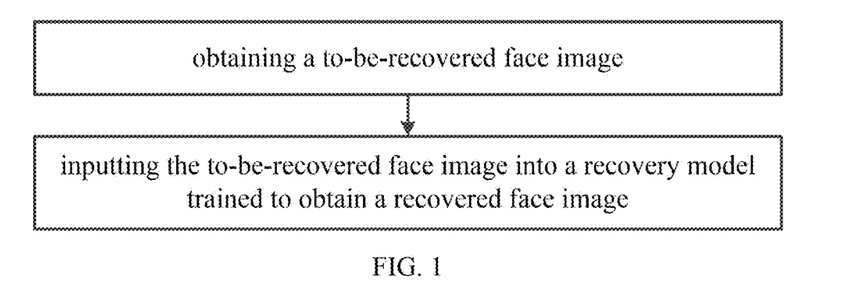
FIG. 1 is a flowchart of a method for recovering a face image based on semantic features provided by the embodiments.
Figure 2:
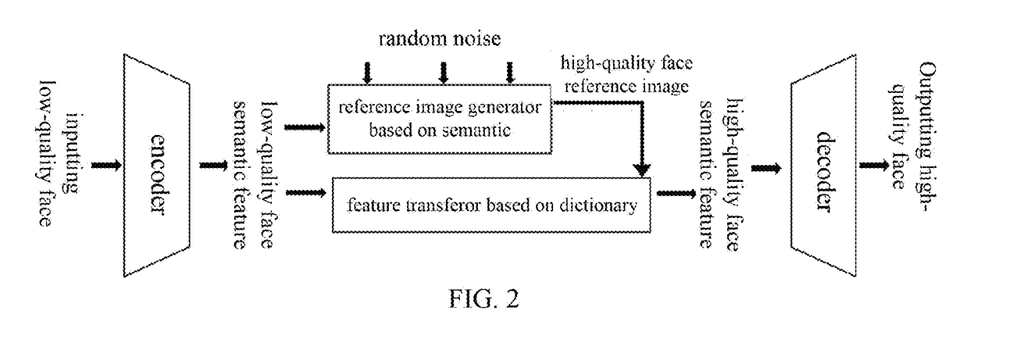
FIG. 2 is a schematic structural diagram of a recovery model provided by the embodiments.

The present application discloses a method for recovering a face image based on semantic features, as shown in FIGS. 1 and 2, which includes:

inputting the to-be-recovered face image into a recovery model trained to obtain a recovered face image;

he recovery model includes:

an encoder, configured for generating low-quality face semantic features based on the to-be-recovered face image;

a reference image generator, configured for generating a plurality of high-quality face reference images by inputting random noise based on the low-quality face semantic features;

a feature transfer, configured for constructing a face component feature dictionary based on the plurality of high-quality face reference images, and transferring high-quality component features in the face component feature dictionary to the low-quality face semantic features to obtain high-quality face semantic features; and a decoder, configured for generating the recovered face image based on the high-quality face semantic features.

The technical concepts of the present application are: a reference image generator based on the recovery model generates a plurality of high-quality face reference images by inputting random noise and guided by semantic information; a feature transfer based on the recovery model constructs a lightweight face component feature dictionary that facilitates fast searching, which improves the problem of ignoring the semantic information by the existing methods, and improves the generalization performance of the face recovery model, and achieves high evaluation index scores and high-quality visualization effects in real scenarios.

Figure 3:
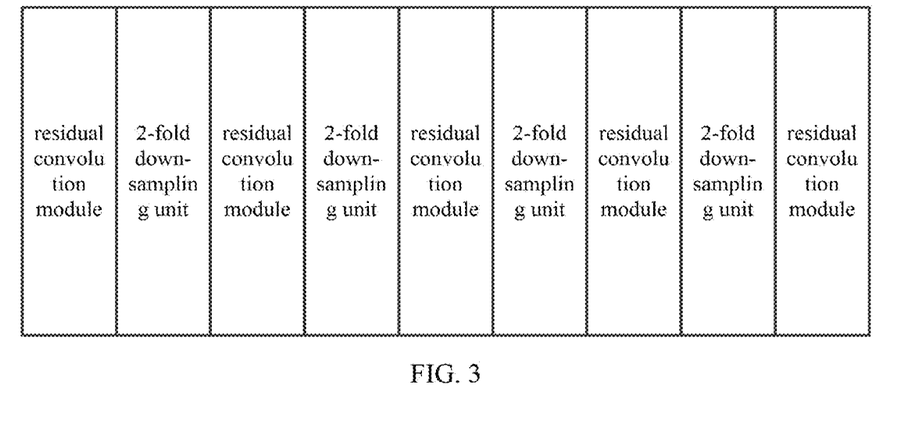
FIG. 3 is a schematic structural diagram of an encoder provided by the embodiments.

As shown in FIG. 3, the encoder consists of five residual convolution units and four 2-fold down-sampling units, and the five residual convolution units and the four 2-fold down-sampling units are connected in series alternately.

Figure 4:
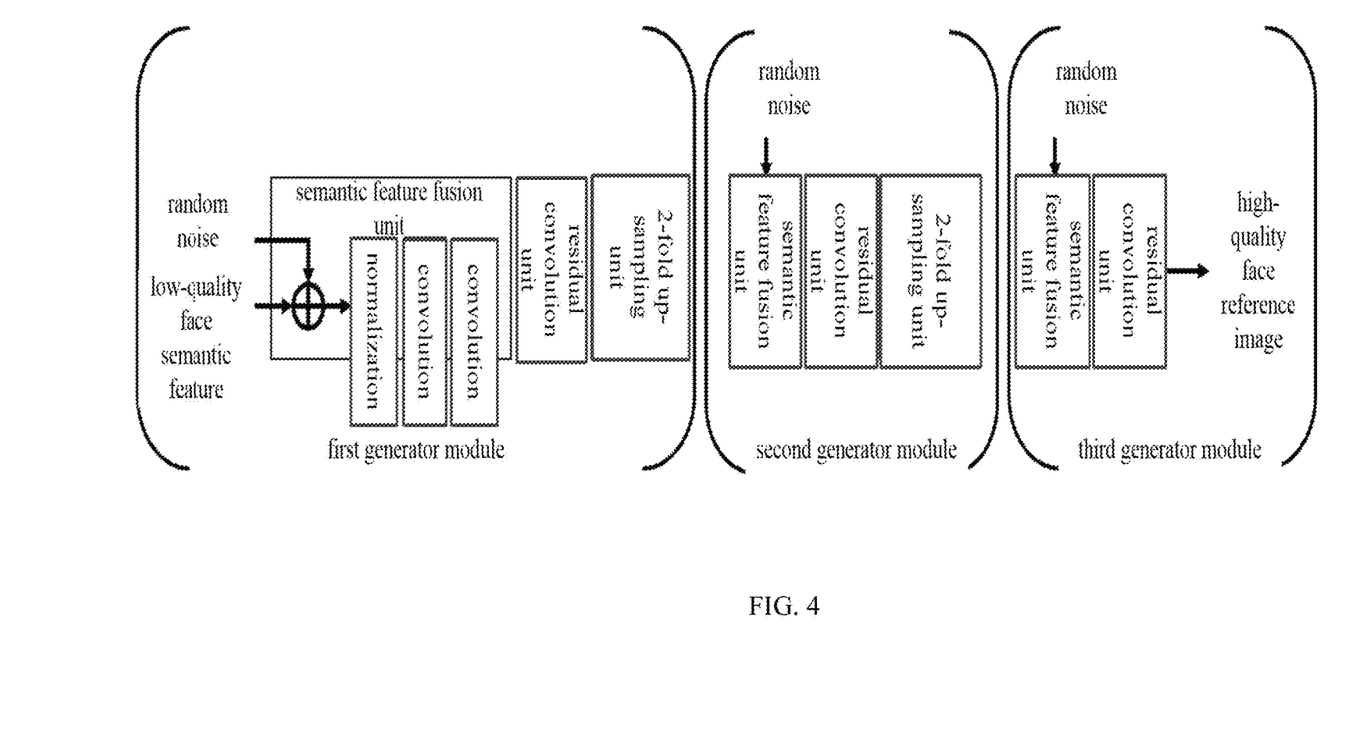
FIG. 4 is a schematic structural diagram of a reference image generator provided by the embodiments.

As shown in FIG. 4,

The reference image generator includes a first generator module, a second generator module and a third generator module connected in series sequentially;

each of the first generator module and the second generator module includes a semantic feature fusion unit, a residual convolution unit and a 2-fold up-sampling unit connected in series sequentially; and the third generator module includes the semantic feature fusion unit and the residual convolution unit connected in series sequentially.

The semantic feature fusion unit includes one normalization layer and two convolution layers connected in series sequentially. The normalization layer uses a Layer Norm (LN).

The semantic feature fusion unit is configured for fusion of low-quality face semantic features and random noise. Specifically, a plurality of sets of Gaussian noise generated based on random seeds are fused with low-quality face semantic features in the semantic feature fusion unit, and this multi-scale multi-stage fusion is utilized to produce a plurality of high-quality face reference images with the same semantic information but with different performances.

Figure 5:
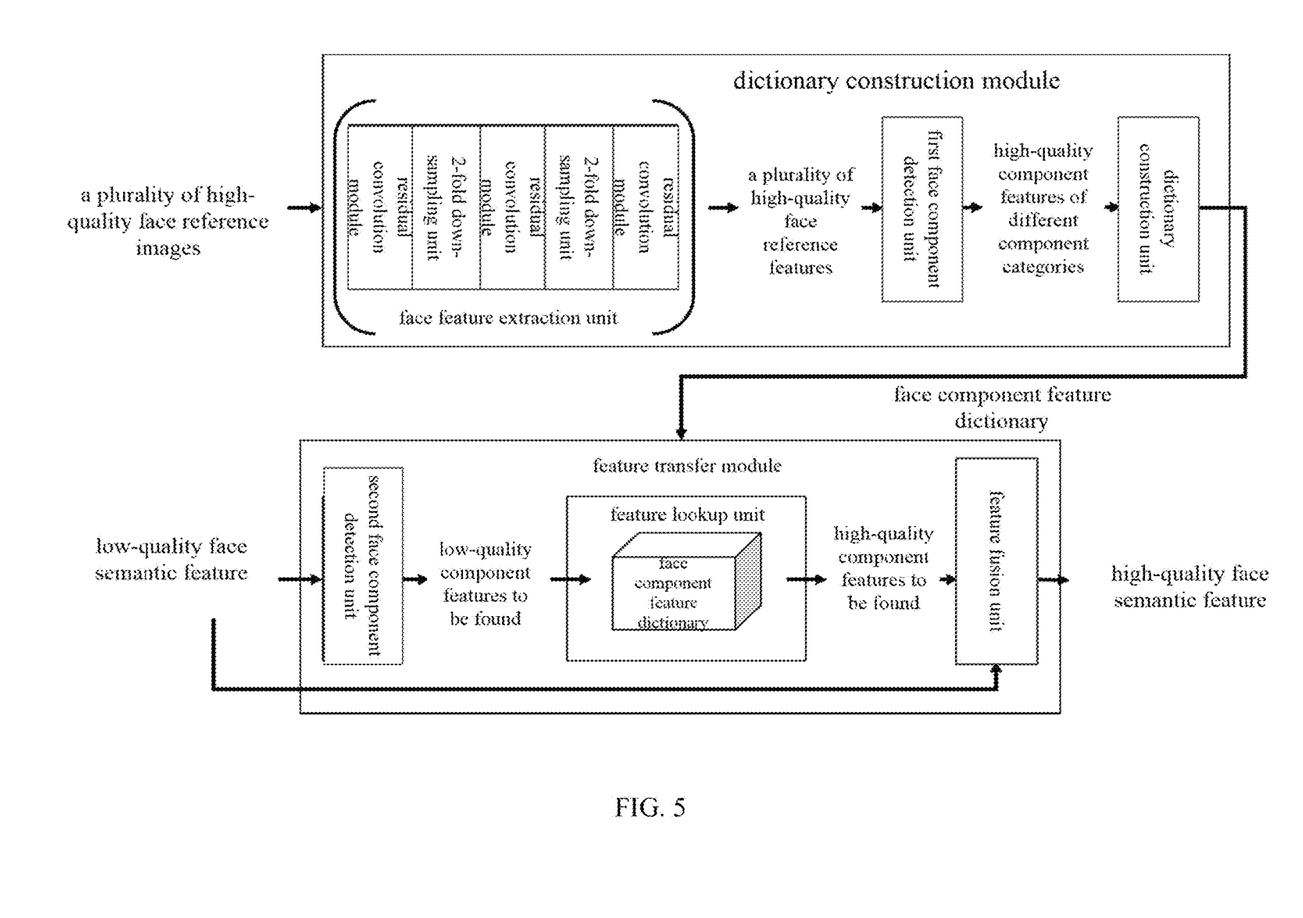
FIG. 5 is a schematic structural diagram of a feature transfer provided by the embodiments.

As shown in FIG. 5, the feature transfer includes a dictionary construction module and a feature transfer module.

The dictionary construction module includes a face feature extraction unit, a first face component detection unit and a dictionary construction unit connected in series sequentially.

the face feature extraction unit includes a plurality of the residual convolution units and 2-fold down-sampling units connected in series sequentially and alternately for obtaining a plurality of high-quality face reference features based on the plurality of high-quality face reference images. Specifically, each high-quality face reference image is learned to obtain high-quality face reference features.

The first face component detection unit is configured for obtaining high-quality component features of different component categories based on the plurality of high-quality face reference features.

The dictionary construction unit is configured for constructing the face component feature dictionary based on the high-quality component features of different component categories.

A feature transfer module includes a second face component detection unit, a dictionary lookup unit and a feature fusion unit connected in series sequentially.

The second face component detection unit is configured for obtaining a low-quality component feature of a corresponding component category based on the low-quality face semantic features.

The dictionary lookup unit is configured for obtaining the high-quality component features of a corresponding component category based on the low-quality component feature and the constructed face component feature dictionary.

The feature fusion unit is configured for fusing the low-quality face semantic features and the high-quality component features of the corresponding component category to obtain the high-quality face semantic features.

Specifically, the first face component detection unit and the second face component detection unit both use publicly available dlib libraries; the dictionary construction unit uses an existing K clustering method; the dictionary lookup unit calculates the similarity between each low-quality component feature to be looked up and each item in the face component feature dictionary, and selects the high-quality component feature with the largest similarity value. The similarity calculation uses Euclidean distance.

The face recovery methods based on dictionary learning in the related art usually construct the dictionary in advance, so that the redundant dictionary requires a large amount of storage and computational overhead when performing face recovery, which is costly, and the initial capacity limits the generalization performance of the model. Therefore, the present application constructs a semantically guided lightweight face component feature dictionary, which avoids the existing problem of constructing a good dictionary in advance, facilitates searching, and ensures the consistency of the face semantic information while guaranteeing the details and textures of the recovery results. The present application is able to achieve high evaluation index scores and high-quality visualization effects in real scenarios.

Figure 6:
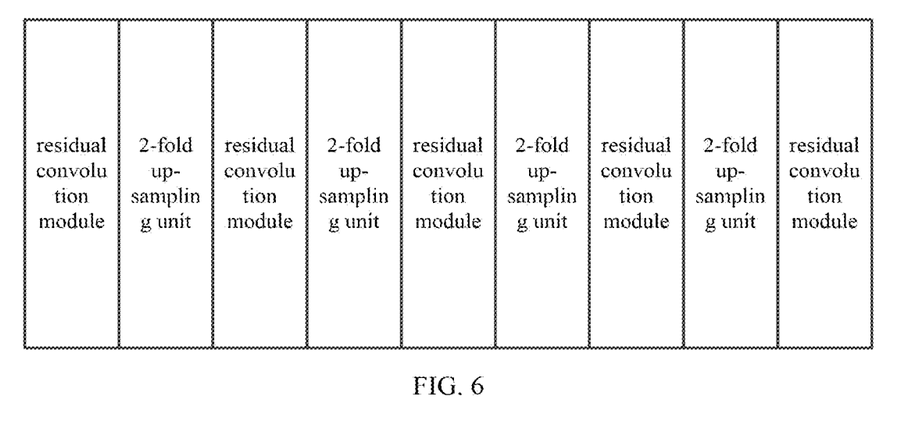
FIG. 6 is a schematic structural diagram of a decoder provided by the embodiments.

As shown in FIG. 6, the decoder includes five residual convolution units and four 2-fold up-sampling units, and the five residual convolution units and the four 2-fold up-sampling units are alternately connected in series.

Figure 7:
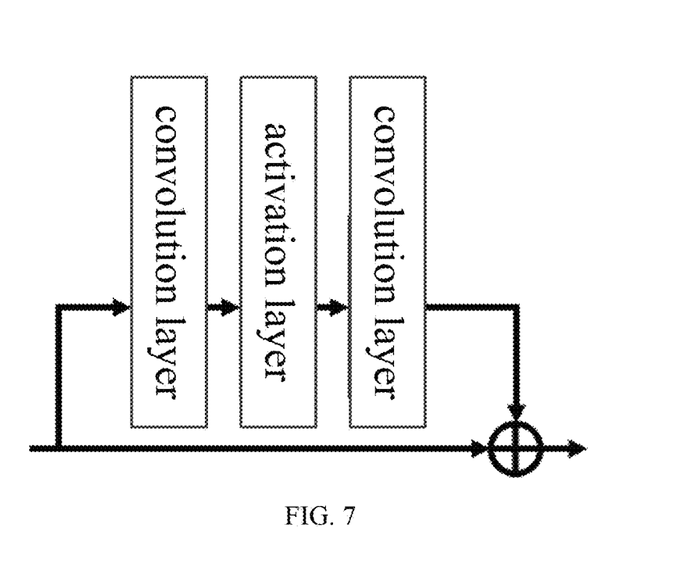
FIG. 7 is a schematic structural diagram of a residual convolution unit provided by the embodiment.

It should be noted that the residual convolution unit involved in this embodiment is to utilize residual learning to fully mine the feature information, as shown in FIG. 7, specifically consists of two convolution layers sequentially connected in series, an activation layer are also connected in series between the two convolution layers, and the features obtained after the input features are input into the two convolution layers and the activation layer and the input features are summed as the output of the unit.

The 2-fold down-sampling unit is a convolution layer with a convolution kernel size of 2 and a step size of 2, whose function is to reduce the size of the input features by a factor of 2. The 2-fold up-sampling unit expands the size of the input features by a factor of 2, which consists of a convolution layer with a convolution kernel size of 1 and a subpixel layer with a 2-fold up-sampling in a series sequentially.

The training method of the recovery model in this embodiment includes:

First, obtaining a training set, the training set includes a to-be-recovered face training image and a corresponding real face recovery image.

Specifically, obtaining the training set includes:

obtaining a high-quality face image from a publicly available face dataset, such as the Flickr-Faces-HQ (FFHQ) high-definition face dataset, and using the high-quality face image as the face real recovery image $I_{hq}$;

adjusting pixels of the high-quality face image to obtain a degraded face image, and taking the degraded face image as the to-be-recovered face training image.

Specifically, each high-quality face image is extracted from the FFHQ dataset and its aspect is adjusted to 512 pixels to obtain the degraded face image. adjusting pixels is expressed as:

$$I_{lq} = \{JPEG_q((I_{hq}*k_\sigma)\downarrow_s + n_\delta)\}\uparrow_s,$$

$I_{lq}$ denotes the degraded face image, i.e., the to-be-recovered face training image; $JPEG_q$ denotes JPEG compression with a compression quality of q; $I_{hq}$ denotes the high-quality face image, i.e., the face real recovery image; * denotes a convolution operation; $k_\sigma$ denotes a fuzzy kernel of sigma=σ; $\downarrow_s$ denotes a s-fold down-sampling operation; $n_\delta$ denotes a Gaussian noise of sigma=δ; and $\uparrow_s$ denotes a s-fold up-sampling operation.

The specific parameters of adjusting pixels can be adjusted according to the actual image and are not limited here.

Second, inputting the to-be-recovered face training image into the pre-constructed recovery model to obtain the recovered face training image.

Third, calculating the recovery model loss function based on the recovered face training image and the corresponding real face recovery image.

The recovery model loss function is expressed as:

$$L = L_{l1} + \lambda_{per}L_{per} + \lambda_{adv}L_{adv},$$

L denotes a recovery model loss function value; $L_{l1}$ denotes a L1 loss value; $\lambda_{per}$ denotes a perceived loss weight; $L_{per}$ denotes a perceived loss value based on a VGG network; $\lambda_{adv}$ denotes an adversarial loss weight; and $L_{adv}$ denotes an adversarial loss value based on adversarial training.

The L1 loss value is expressed as:

$$L_{l1} = |I_{hq} - \hat{I}_{hq}|_1,$$

$I_{hq}$ denotes the face real recovery image; $\hat{I}_{hq}$ denotes the recovered face training image; and $|\cdot|_1$ denotes an average absolute error;

the perceived loss value $L_{per}$ based on the VGG network is expressed as:

$$L_{per} = \|\emptyset(I_{hq}) - \emptyset(\hat{I}_{hq})\|_2^2,$$

Ø denotes feature maps from a first to fifth convolution layers in the pre-trained VGG model; $\|\cdot\|_2^2$ denotes a square of a 2-parameter;

the adversarial loss value $L_{adv}$ based on adversarial training is expressed as:

$$L_{adv} = -E_{\hat{I}_{hq}} \text{softplus}(D(\hat{I}_{hq})),$$

D(·) denotes an output of a discriminator in the adversarial training; $E_{\hat{I}_{hq}}$ denotes an expected value about a $\hat{I}_{hq}$ distribution; softplus denotes a softplus function, which is expressed as:

$$\text{softplus}(x) = \ln(1 + e^x).$$

Fourth, the recovery model is trained based on iterative updating of the recovery model by the gradient descent method, and the recovery model with the smallest loss function of the recovery model is used as the trained recovery model.

It should be appreciated by those skilled in the art that embodiments of the present application may be provided as methods, systems, or computer program products. Thus, the present application may take the form of a fully hardware embodiment, a fully software embodiment, or an embodiment that combines software and hardware aspects. Further, the present application may take the form of a computer program product implemented on one or more computer-usable storage media (including, but not limited to, disk memory, CD-ROM, optical memory, and the like) that contain computer-usable program code therein.

The present application is described with reference to flowcharts and/or block diagrams of methods, devices (systems), and computer program products according to embodiments of the present application. It should be understood that each of the processes and/or boxes in the flowchart and/or block diagram, and the combination of processes and/or boxes in the flowchart and/or block diagram, may be implemented by computer program instructions. These computer program instructions may be provided to a processor of a general-purpose computer, a special-purpose computer, an embedded processor, or other programmable data-processing device to produce a machine such that the instructions executed by the processor of the computer or other programmable data-processing device produce a device for carrying out the functions specified in the one process or a plurality of processes of the flowchart and/or the one box or a plurality of boxes of the box diagram.

These computer program instructions may also be stored in computer-readable memory capable of directing the computer or other programmable data processing device to operate in a particular manner such that the instructions stored in the computer-readable memory produce an article of manufacture comprising an instruction device that implements the function specified in the flowchart one process or a plurality of processes and/or the box diagram one box or a plurality of boxes.

These computer program instructions may also be loaded onto a computer or other programmable data processing device such that a series of operational steps are performed on the computer or other programmable device to produce computer-implemented processing, such that the instructions executed on the computer or other programmable device provide steps for implementing the functionality specified in the flowchart one process or a plurality of processes and/or the box diagram one box or a plurality of boxes.

The foregoing is only a preferred embodiment of the present application, and it should be noted that: for those skilled in the art, without departing from the principles of the present application, a number of improvements and embellishments may be made, which shall also be considered as the scope of the present application.

What is claimed is:

1. A method for recovering a face image based on semantic features, comprising:
   obtaining a to-be-recovered face image:
   inputting the to-be-recovered face image into a recovery model trained to obtain a recovered face image;
   wherein the recovery model comprises:
   an encoder, configured for generating low-quality face semantic features based on the to-be-recovered face image:
   a reference image generator, configured for generating a plurality of high-quality face reference images by inputting random noise based on the low-quality face semantic features:
   a feature transfer, configured for constructing a face component feature dictionary based on the plurality of high-quality face reference images, and transferring high-quality component features in the face component feature dictionary to the low-quality face semantic features to obtain high-quality face semantic features; and
   a decoder, configured for generating the recovered face image based on the high-quality face semantic features:
   wherein the feature transfer comprises a dictionary construction module and a feature transfer module;
   the dictionary construction module comprises a face feature extraction unit, a first face component detection unit and a dictionary construction unit connected in series sequentially;
   the face feature extraction unit comprises a plurality of the residual convolution units and 2-fold down-sampling units connected in series sequentially and alternately for obtaining a plurality of high-quality face reference features based on the plurality of high-quality face reference images;
   the first face component detection unit, configured for obtaining high-quality component features of different component categories based on the plurality of high-quality face reference features;
   the dictionary construction unit, configured for constructing the face component feature dictionary based on the high-quality component features of different component categories;
   a feature transfer module comprises a second face component detection unit, a dictionary lookup unit and a feature fusion unit connected in series sequentially;
   the second face component detection unit, configured for obtaining a low-quality component feature of a corresponding component category based on the low-quality face semantic features;
   the dictionary lookup unit, configured for obtaining the high-quality component features of a corresponding component category based on the low-quality component feature and the constructed face component feature dictionary; and
   the feature fusion unit, configured for fusing the low-quality face semantic features and the high-quality component features of the corresponding component category to obtain the high-quality face semantic features.

2. The method for recovering the face image based on semantic features according to claim 1, wherein the decoder comprises five residual convolution units and four 2-fold up-sampling units, the five residual convolution units and the four 2-fold up-sampling units are alternately connected in series.

3. The method for recovering the face image based on semantic features according to claim 1, wherein the encoder comprises five residual convolution units and four 2-fold down-sampling units, and the five residual convolution units and the four 2-fold down-sampling units are alternately connected in series.

4. The method for recovering the face image based on semantic features according to claim 1, wherein the reference image generator comprises a first generator module, a second generator module and a third generator module connected in series sequentially;
   wherein each of the first generator module and the second generator module comprises a semantic feature fusion unit, a residual convolution unit and a 2-fold up-sampling unit connected in series sequentially; and
   the third generator module comprises the semantic feature fusion unit and the residual convolution unit connected in series sequentially.

5. The method for recovering the face image based on semantic features according to claim 4, wherein the semantic feature fusion unit comprises one normalization layer and two convolution layers connected in series sequentially, and the semantic feature fusion unit is configured for fusion of the low-quality face semantic features and the random noise.

6. A method for recovering a face image based on semantic features, comprising:
   obtaining a to-be-recovered face image;
   inputting the to-be-recovered face image into a recovery model trained to obtain a recovered face image;
   wherein the recovery model comprises:
   an encoder, configured for generating low-quality face semantic features based on the to-be-recovered face image;
   a reference image generator, configured for generating a plurality of high-quality face reference images by inputting random noise based on the low-quality face semantic features;
   a feature transfer, configured for constructing a face component feature dictionary based on the plurality of high-quality face reference images, and transferring high-quality component features in the face component feature dictionary to the low-quality face semantic features to obtain high-quality face semantic features; and
   a decoder, configured for generating the recovered face image based on the high-quality face semantic features;
   wherein the method for training the recovery model comprises:
   obtaining a training set, wherein the training set comprises a to-be-recovered face training image and a corresponding real face recovery image;
   inputting the to-be-recovered face training image into the pre-constructed recovery model to obtain a recovered face training image;
   calculating a recovery model loss function based on the recovered face training image and the corresponding face real recovery image;
   iteratively updating the recovery model based on a gradient descent method, and taking the recovery model with a smallest recovery model loss function as the trained recovery model.

7. The method for recovering the face image based on semantic features according to claim 6, wherein obtaining the training set comprises:

obtaining a high-quality face image, and taking the high-quality face image as the face real recovery image;

adjusting pixels of the high-quality face image to obtain a degraded face image, and taking the degraded face image as the to-be-recovered face training image;

wherein adjusting pixels is expressed as:

$$I_{lq} = \{JPEG_q((I_{hq} * k_\alpha)\downarrow_s + n_\delta)\}\uparrow_s,$$

wherein $I_{lq}$ denotes the degraded face image, i.e., the to-be-recovered face training image; $JPEG_q$ denotes JPEG compression with a compression quality of q; $I_{hq}$ denotes the high-quality face image, i.e., the face real recovery image; * denotes a convolution operation; $k_\alpha$ denotes a fuzzy kernel of sigma=; $\downarrow_s$ denotes a s-fold down-sampling operation; $n_\delta$ denotes a Gaussian noise of sigma=δ; and $\uparrow_s$ denotes a s-fold up-sampling operation.

8. The method for recovering the face image based on semantic features according to claim 6, wherein the recovery model loss function is expressed as:

$$L = L_{l1} + \lambda_{per}L_{per} + \lambda_{adv}L_{adv},$$

wherein L denotes a recovery model loss function value; $L_{l1}$ denotes a L1 loss value; $\lambda_{per}$ denotes a perceived loss weight; $L_{per}$ denotes a perceived loss value based on a VGG network; $\lambda_{adv}$ denotes an adversarial loss weight; and $L_{adv}$ denotes an adversarial loss value based on adversarial training.

9. The method for recovering the face image based on semantic features according to claim 8, wherein the L1 loss value $L_{l1}$ is expressed as:

$$L_{l1} = |I_{hq} - \hat{I}_{hq}|_1,$$

wherein $I_{hq}$ denotes the face real recovery image; $\hat{I}_{hq}$ denotes the recovered face training image; and $|\cdot|_1$ denotes an average absolute error;

the perceived loss value $L_{per}$ based on the VGG network is expressed as:

$$L_{per} = \|\varnothing(I_{hq}) - \varnothing(\hat{I}_{hq})\|_2^2,$$

wherein ∅ denotes feature maps from a first to fifth convolution layers in the pre-trained VGG model; $\|\cdot\|_2^2$ denotes a square of a 2-parameter;

the adversarial loss value $L_{adv}$ based on adversarial training is expressed as:

$$L_{adv} = -E_{\hat{I}_{hq}} \text{softplus}(D(\hat{I}_{hq})),$$

wherein D(·) denotes an output of a discriminator in the adversarial training; $E_{\hat{I}_{hq}}$ denotes an expected value about a $\hat{I}_{hq}$ distribution; softplus denotes a softplus function, which is expressed as:

$$\text{softplus}(x) = \ln(1 + e^x).$$

* * * * *